(No Model.) 3 Sheets—Sheet 1.
M. R. HAYES.
APPARATUS FOR HEATING SALT WATER PREPARATORY TO PURIFYING AND EVAPORATING THE SAME.
No. 273,988. Patented Mar. 13, 1883.
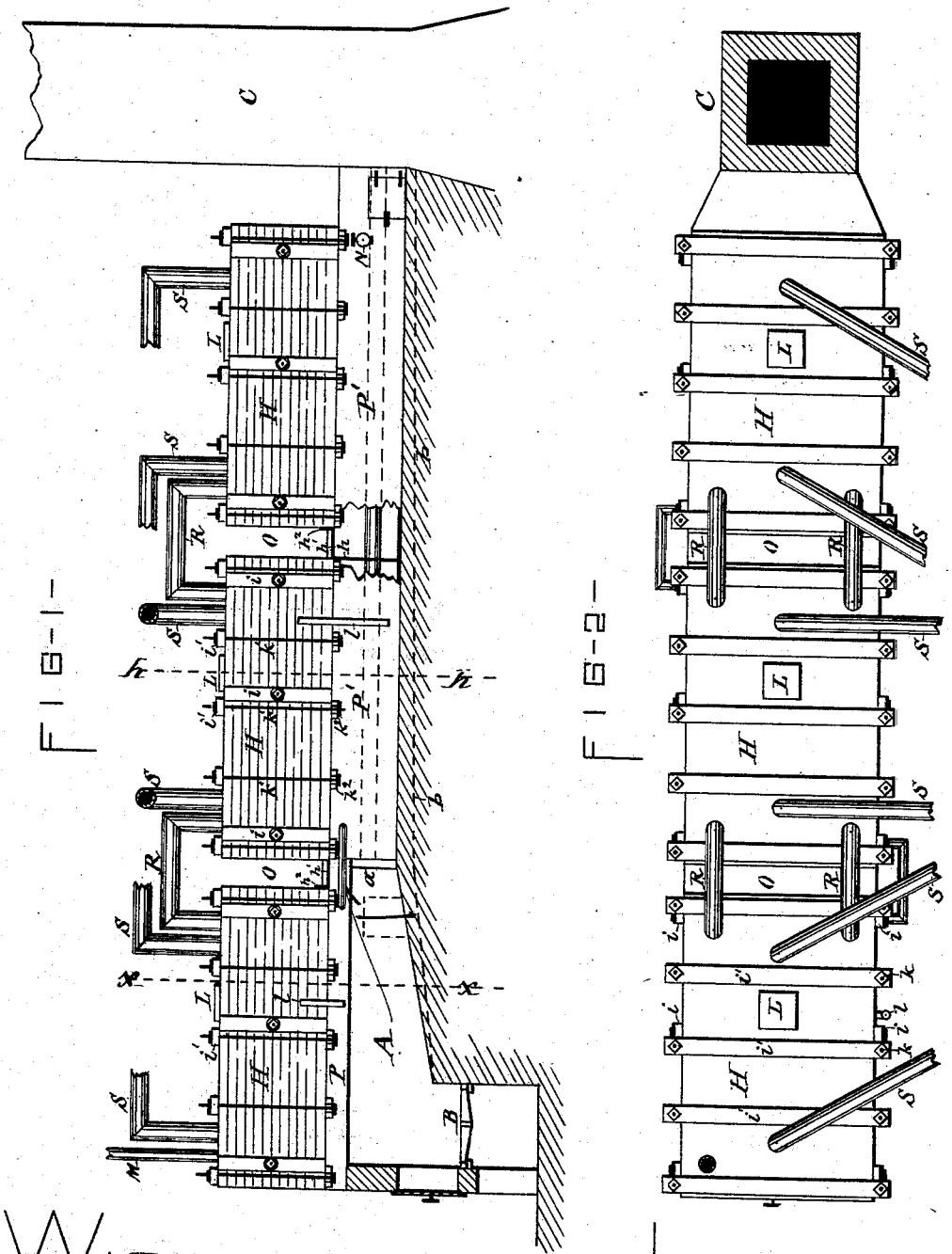

(No Model.) 3 Sheets—Sheet 2.
M. R. HAYES.
APPARATUS FOR HEATING SALT WATER PREPARATORY TO PURIFYING AND EVAPORATING THE SAME.
No. 273,988. Patented Mar. 13, 1883.
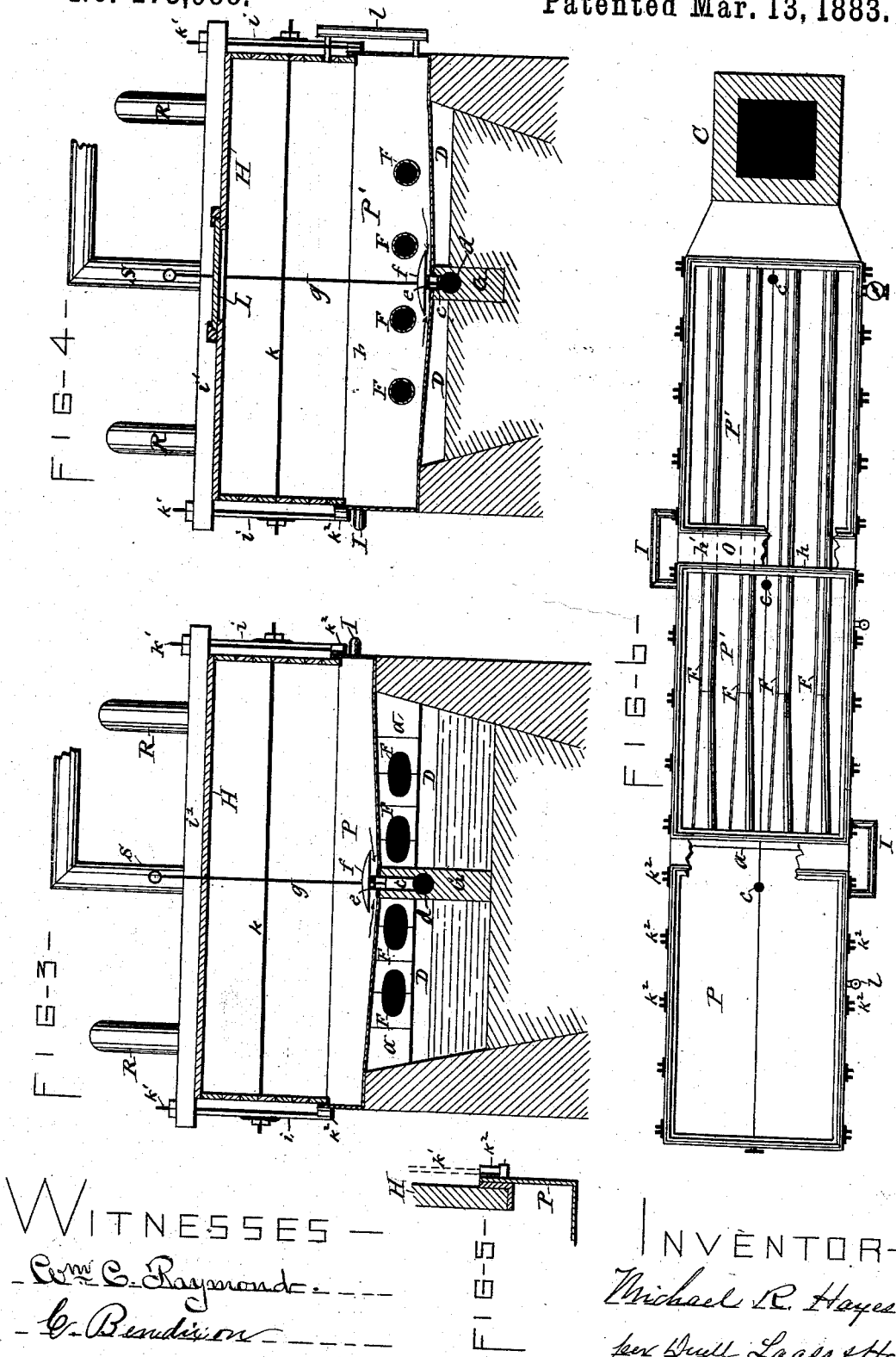

(No Model.) 3 Sheets—Sheet 3.
M. R. HAYES.
APPARATUS FOR HEATING SALT WATER PREPARATORY TO PURIFYING
AND EVAPORATING THE SAME.
No. 273,988. Patented Mar. 13, 1883.
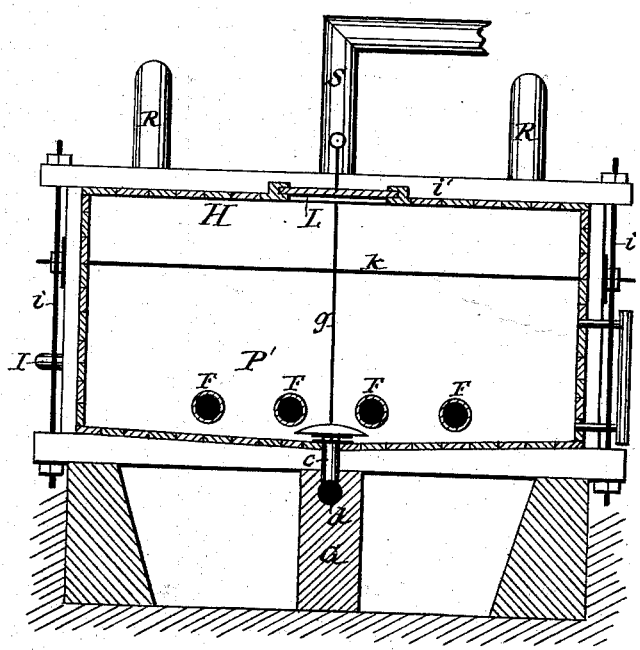
FIG-7-
WITNESSES—
Wm. C. Raymond
C. Benedixon
INVENTOR—
Michael R. Hayes
per Dually, Laass & Hey
his Attys

UNITED STATES PATENT OFFICE.

MICHAEL R. HAYES, OF SYRACUSE, NEW YORK.

APPARATUS FOR HEATING SALT-WATER PREPARATORY TO PURIFYING AND EVAPORATING THE SAME.

SPECIFICATION forming part of Letters Patent No. 273,988, dated March 13, 1883.

Application filed February 7, 1883. (No model.)

*To all whom it may concern:*

Be it known that I, MICHAEL R. HAYES, of Syracuse, in the county of Onondaga, in the State of New York, have invented new and useful Improvements in Apparatus for Heating Salt-Water Preparatory to Purifying and Evaporating the Same, of which the following, taken in connection with the accompanying drawings, is a full, clear, and exact description.

This invention relates to an apparatus designed to heat and reduce salt-water or natural brine to saturation, or about 90° to 100° salinometer, preparatory to purifying and evaporating said brine, and converting the same into salt; and it consists in an improved construction and arrangement of the constituent parts of the said apparatus, whereby the aforesaid result is attained with a minimum expenditure of fuel, and in a most simple, economical, reliable, and effective manner, all as hereinafter more fully described, and specifically set forth in the claims.

The invention is fully illustrated in the annexed drawings, wherein Figure 1 is a side elevation of the apparatus with the side wall removed to illustrate the construction of the fire-arch and its relation to the salt-water pans or tanks. Fig. 2 is a top view of the same. Figs. 3 and 4 are enlarged vertical transverse sections taken, respectively, on lines $xx$ and $yy$ in Fig. 1. Fig. 5 is an enlarged sectional view, illustrating the connection of the cover with the salt-water pan. Fig. 6 is a plan view of the pans or vats with the cover removed, and Fig. 7 is a transverse section of the apparatus as constructed specially for the treatment of brine contaminated with plaster or other incrusting matter.

Similar letters of reference indicate corresponding parts.

A represents a fire-arch or furnace, provided with a suitable fire-grate, B, and otherwise constructed in an ordinary manner.

P designates a stout metal pan, mounted on the inclosing-walls of the fire-arch, and supported at a proper elevation above the grate to protect it against excessive heat.

Adjoining the end of the pan P, and placed in a lower plane, is another prolonged pan or tank, P', the construction and means of heating of which depend on the nature of the brine to be treated. When said brine is free of plaster and other incrusting matter, I construct the pan P' of boiler-iron or heavy sheet metal, and arrange under the bottom thereof a fire-flue, D, extended from the fire-arch A to the chimney C, as illustrated in Figs. 3 and 4 of the drawings, and indicated by dotted lines $b\ b$ in Fig. 1; but for the treatment of brine contaminated as aforesaid I prefer to construct the pan or tank P' of wood, as represented in Fig. 7 of the drawings, the bottom flue, D, in this case being dispensed with. The pan or tank P', whether constructed of metal or wood, has extending longitudinally through it fire-flues F F, communicating at one end with the fire-arch and at the opposite end with the chimney C, said fire-flues being arranged below the standard water-line of the tank P', so as to be submerged in the brine, and thus exert thereon their heating capacity to the best advantage, and at the same time be protected against the destructive effects of the products of combustion passing through them. These flues F F may be constructed of either cast or wrought iron, though preferably of the latter, and their ends adjacent to the fire-box are secured to the end of the tank P', which is provided with proper openings, through which the flues communicate with the fire-box, the end of the tank being invariably of heavy sheet metal and lined with fire-brick or tile $a$ on the side facing the fire-arch.

The bottoms of all the pans or tanks P and P', I form with a longitudinal central depression and incline them toward one end, preferably the end farthest from the fire-arch, and at the lowest point of the bottoms of the respective pans or tanks I tap said bottoms by a discharge-pipe, $c$, which leads to a pipe, $d$, inclosed in the wall G, which is extended longitudinally along the under side of the center of the pan, and supports the same, the pipe $d$ being thus protected from the heat passing through the flue D.

In the upper end of the discharge-pipe $c$, I fit a puppet-valve, $e$, having connected to it a manipulating-rod, $g$, which is extended through the top of the cover H, hereinafter described. The valve $e$, I provide, above its seat, with a horizontally-distended disk, $f$, which serves to deflect the suction when the valve is opened, and causes the bottom stratum of the contents of the pan or tank to be drawn toward and out through the discharge-pipe c. This is very essential, inasmuch as the impurities of the brine are precipitated in the pan or tank, as hereinafter explained. The pipe d carries the impurities to the end of the apparatus, where, by a branch pipe, they may be conducted away either to waste or to a suitable receptacle, in which to collect them for such purposes as may be deemed desirable. The pans P P', I divide into compartments by transverse partitions h h, and establish communications between them alternately at opposite sides by pipes I, tapping said pans slightly above the bottom thereof, so as to leave the impurities of the brine undisturbed on the bottom of the respective pan-compartments. The placement of the pipes I alternately at opposite sides of the pans deflects and retards the current of the brine through the respective pans, and thus more effectually diffuses the heat through said brine.

H represents an air-tight cover applied to the top of the pans or tanks P P', said covers being constructed in sections fitted to the respective compartments of the pans or tanks, and formed of sound wooden planks, properly jointed and secured together by girders or plates $i$ $i'$, placed vertically against the sides and across the top of the exterior of the covers, and tie-rods K K, extended horizontally through the cover and through the side stay-plates, and provided with nuts on their ends for tightening the same; vertical rods K', connected to the ends of the top plates, $i'$, and to a clip, $K^2$, fixed to the exterior of the pans, serve to tighten the sides of the cover and to fasten the covers to the pans. When the tank P' is constructed of wood, said tank and its cover may consist of one structure—i. e., the sides of the tank may be extended to form the sides of the cover, and the top of the cover tied to the bottom of the tank by girders or tie-beams extended across the bottom, as well as across the top, and vertical rods on the outside of the structure, connecting the top girders with the bottom girders, as illustrated in Fig. 7 of the drawings. These covers I make steam-tight by calking the joints thereof, a man-hole, L, closed by a removable cover, being provided in the top of the cover H, to obtain access to the interior of the apparatus for cleaning or repairing the same, an inlet-pipe, M, for the crude brine, or brine to be treated, being applied to the elevated or front end of the apparatus, and an exit-pipe, N, with a stop-cock, being connected to the opposite or lower end of the tank P', and at a proper distance above the bottom thereof, to discharge the purified or partly-purified brine.

$l$ $l$ designate water-gages for determining the height of the water in the pans or tanks P P'.

The space over the pans or tanks between the respective covers I close by a horizontal extension, $h'$, of the partition-plate $h$, terminating with a vertical flange, $h^2$, which is fitted steam-tight against the end of one of the covers, the space o between the covers forming passages for the operator to pass from one side of the apparatus to the other.

In order to regulate the steam-pressure under the several covers H H, I connect them by steam-ducts R R, extended from one cover to the other, as shown in Figs. 1 and 2 of the drawings.

S S represent steam-ducts extended from the covers H H, and leading to suitable tanks or other apparatus adapted for further purifying and evaporating the brine, (not shown here,) in which to utilize the escaping steam or vapor for reheating the brine, conducted thereto from the pans or tanks P P' by a conduit connected to the exit N, hereinbefore described.

The operation of my invention is as follows: The crude brine is introduced to the higher pan, P, by the inlet-pipe M and the pans or vats P P' filled to the proper depth. Fire is then started in the furnace A, and kept at the proper temperature to heat the brine in the pans or vats sufficient to expel steam or vapor without agitating said brine by ebullition. The brine, in its passage from the inlet M to the exit N, becomes sufficiently heated and evaporated to become saturated, or acquire a density of 90° to 100° salinometer, at which stage the plaster and other impurities with which natural brines are usually contaminated become precipitated. The connection between the successive pans being above the bottom thereof allows each pan to collect a certain proportion of the impurities, which can be discharged from the pans by lifting the valves $e$, the horizontally-distended deflecting-plate $f$ of which prevents the supernatant pure brine from escaping through the discharge-pipe $c$, and causes the impure substance (sometimes called "bitter water," which holds the plaster in a semi-fluid state) to flow down the inclined bottom of the pan to the discharge-pipe $c$. The supernatant purified or partially-purified brine flows on from pan to pan through the connecting-pipes I I and escapes through the outlet N, from whence it is conducted to another apparatus, in which it is to be further purified, evaporated, and reduced to salt by the aid of the vapor or steam conducted thereto from the covers H H by means of the ducts S S.

When it is desired to clean or repair my improved apparatus, the inlet M is to be closed, the fire of the furnace or fire-arch A to be cooled down or withdrawn, and the valves to be opened. The man-hole L may then be opened to allow the operator to enter the apparatus.

Having described my invention, what I claim as new, and desire to secure by Letters Patent, is—

1. In combination with a furnace, a pan arranged over said furnace, an adjoining pan, set in a lower plane than the first pan, and joined therewith at the end of the furnace, fire-flues extended longitudinally through the lower pan, and covers fitted air-tight to the said pans, and provided with steam-discharge ducts, substantially as described and shown.

2. The combination of the pan seated over a fire-arch or fire-flue, and formed with a longitudinal central depression, and with a discharge-opening in said depression, a supporting-wall extended longitudinally under said depression, a water-duct inclosed in said wall, and communicating with the discharge-openings of the pan, and a valve applied to said discharge-opening, substantially as shown and set forth.

3. In combination with the pan provided in its bottom with a discharge-opening, a puppet-valve provided with a distended deflecting-plate above the valve-seat and independent thereof, substantially in the manner described and shown, for the purpose specified.

4. An apparatus for purifying natural brine, consisting of a tank or vat for the reception of the brine, having a centrally-depressed bottom, a discharge-opening in the depression, a valve in said discharge-opening, a horizontal disk extended over and around the valve, and heating-flues extended through the tank, all as and for the purpose shown and set forth.

In testimony whereof I have hereunto signed my name and affixed my seal, in the presence of two attesting witnesses, at Syracuse, in the county of Onondaga, in the State of New York, this 27th day of January, 1883.

MICHAEL R. HAYES. [L. S.]

Witnesses:
FREDERICK H. GIBBS,
C. H. DUELL.